(12) United States Patent
Zhao et al.

(10) Patent No.: US 9,915,861 B2
(45) Date of Patent: Mar. 13, 2018

(54) DEVICE FOR CONVERTING WAVELENGTH AND PROJECTION LIGHT SOURCE

(71) Applicants: Hisense Co., Ltd., Qingdao, Shandong Province (CN); Hisense USA Corp., Suwanee, GA (US); Hisense International Co., Ltd., Qingdao, Shandong Province (CN)

(72) Inventors: Fei Zhao, Qingdao (CN); Xianrong Liu, Qingdao (CN); Ruhai Guo, Qingdao (CN)

(73) Assignees: Hisense Co., Ltd., Qingdao (CN); Hisense USA Corp., Suwanee, GA (US); Hisense International Co., Ltd., Qingdao (CN)

( * ) Notice: Subject to any disclaimer, the term of this patent is extended or adjusted under 35 U.S.C. 154(b) by 0 days.

(21) Appl. No.: 15/414,348

(22) Filed: Jan. 24, 2017

(65) Prior Publication Data

US 2017/0351166 A1 Dec. 7, 2017

(30) Foreign Application Priority Data

Jun. 7, 2016 (CN) .......................... 2016 1 0406867

(51) Int. Cl.
*G03B 21/20* (2006.01)
*G02B 27/14* (2006.01)
*G02B 26/00* (2006.01)

(52) U.S. Cl.
CPC .......... *G03B 21/204* (2013.01); *G02B 26/008* (2013.01); *G02B 27/141* (2013.01); *G03B 21/208* (2013.01); *G03B 21/2066* (2013.01)

(58) Field of Classification Search
CPC .............. G03B 21/204; G03B 21/2066; G03B 21/208; G02B 26/008; G02B 27/141
See application file for complete search history.

(56) References Cited

U.S. PATENT DOCUMENTS

2009/0101839 A1* 4/2009 Erlbacher .......... G02B 21/0076
250/459.1

* cited by examiner

*Primary Examiner* — Sultan Chowdhury
*Assistant Examiner* — Magda Cruz
(74) *Attorney, Agent, or Firm* — Brinks Gilson & Lione

(57) ABSTRACT

A device for converting wavelength and a projection light source are disclosed in the present disclosure. According to an example, the device may comprise a roller, a drive motor, a first reflector, a support shaft, a drive module and a dichroic film. An axis of the support shaft may be coincided with an axis of the roller. The support shaft may be not rotated with rotation of the roller. The drive motor may drive the roller rotate around the support shaft and the drive module may drive the roller to move back and forth along an axial direction of the support shaft. So excitation light reflected by the first reflector may be incident uniformly on the sidewall of the roller. Therefore, fluorescent powder conversion efficiency may be improved compared with that of the excitation light incident on a fixed area.

20 Claims, 8 Drawing Sheets

DEVICE FOR CONVERTING WAVELENGTH AND PROJECTION LIGHT SOURCE

CROSS REFERENCE TO RELATED APPLICATIONS

This application claims priority to Chinese Patent Application No. 201610406867.6 filed on Jun. 7, 2016, the entire content of which is incorporated herein by reference in its entirety.

TECHNICAL FIELD

The present disclosure relates to a device for converting wavelength and a projection light source.

BACKGROUND

Display quality of a projection device may be directly affected by light emission quality and service life of a projection light source.

Laser light may be used to excite fluorescent powder to emit fluorescence of required color, so as to achieve conversion of light beam color. For example, a device for converting wavelength may be a fluorescent powder wheel. Partial area of the fluorescent powder wheel may be coated with a fluorescent powder layer of required color (hereinafter referred to as a fluorescent area), such as an area coated with red and green fluorescent powder. Partial area of the fluorescent powder wheel may be a transmitting area. When the device for converting wavelength is rotated at a high speed, if blue laser light is incident on the fluorescent powder layer, the fluorescent powder layer may be excited by the blue laser light in a way that a fluorescence beam may be generated. Color of the fluorescence beam may be the same as that of the fluorescent powder. If the blue laser light is incident on the transmitting area, the blue laser light may be transmitted. In this way, laser light of different colors may be generated successively. Since all blue laser light is incident on an irradiated area of the fluorescent powder wheel, a large amount of heat may be generated in the irradiated area of the fluorescent powder wheel, and temperature of the fluorescent powder may be extremely high. Under such a high temperature, efficiency of blue excitation light being converted into fluorescence beam by the excited fluorescent powder may be lowered. Aging of the fluorescent powder may be accelerated. Light emission quality and service life of the projection light source may be reduced.

SUMMARY

In order to improve fluorescent powder conversion efficiency, the light emission quality and service life of the projection light source, a device for converting wavelength and a projection light source are provided.

According to a first aspect of the present disclosure, a device for converting wavelength is provided. The device for converting wavelength may comprise:

a roller with a sidewall made of a light transmitting medium, wherein the sidewall of the roller comprises a fluorescent area;

a support shaft with an axis coincided with an axis of the roller;

a drive motor to drive the roller to rotate around the support shaft;

a drive module to drive the roller to move back and forth along an axial direction of the support shaft;

a first reflector disposed in the roller and fixedly connected with the support shaft, wherein, there is a preset angle between a mirror surface of the first reflector and the axis of the support shaft, and the first reflector is used to reflect excitation light incident on the roller toward the fluorescent area in a way that fluorescence of at least one color is generated and transmitted through the sidewall of the roller; and a dichroic film disposed on an inner side which is closer to the axis of the roller than the fluorescent area and configured to transmit the excitation light and reflect the fluorescence of the at least one color.

According to a second aspect of the present disclosure, a device for converting wavelength is provided, and the device for converting wavelength may comprise:

a roller with a sidewall made of a light transmitting medium, wherein the sidewall of the roller comprises a fluorescent area;

a support shaft with an axis coincided with an axis of the roller;

a drive motor to drive the roller to rotate around the support shaft;

a drive module to drive the roller to move back and forth along an axial direction of the support shaft;

a first reflector disposed in the roller and fixedly connected with the support shaft, wherein, there is a preset angle between a mirror surface of the first reflector and the axis of the support shaft, and the first reflector is configured to reflect excitation light incident on the roller toward the fluorescent area in a way that fluorescence of at least one color is generated; and a dichroic film disposed on an outer side which is farther from the axis of the roller than the fluorescent area to transmit the excitation light and reflect the fluorescence of the at least one color.

According to a third aspect of the present disclosure, a projection light source is provided, the projection light source may comprise:

the device for converting wavelength according to the first aspect;

a first laser light emitting device configured to emit a first excitation light to the mirror surface of the first reflector along the axial direction of the support shaft of the wavelength conversion device;

a light receiving lens configured to receive the fluorescence of the at least one color and the first excitation light transmitted through the sidewall of the roller and emit the received light; and a light homogenizing device configured to receive the fluorescence of the at least one color and the first excitation light emitted from the light receiving lens and uniformly emit three primary-color light.

According to a fourth aspect of the present disclosure, a projection light source is provided, the projection light source may comprise:

the device for converting wavelength according to the first aspect;

a first laser light emitting device to emit a first excitation light to the mirror surface of the first reflector along the axial direction of the support shaft;

a second laser light emitting device to emit a second laser light which is different in color from the first excitation light;

a light receiving lens to receive the fluorescence of the at least one color and the excitation light transmitted through the sidewall of the roller and emit the received light; and a light homogenizing device to receive the second laser light, the fluorescence of the at least one color and the first excitation light, and uniformly emit three primary-color light.

According to a fifth aspect of the present disclosure, a projection light source is provided, the projection light source may comprise:

the device for converting wavelength according to the second aspect;

a first laser light emitting device to emit a first excitation light to the mirror surface of the first reflector along the axial direction of the support shaft;

a dichroic mirror disposed between the first laser light emitting device and the first reflector to transmit the first excitation light;

a second reflector disposed on an optical path of the first excitation light transmitted by the roller and the dichroic film in a way that the first excitation light is reflected;

a third reflector disposed on an optical path of the first excitation light reflected by the second reflector in a way that the first excitation light reflected by the second reflector is reflected to the dichroic mirror;

a light receiving lens disposed on an optical path between the first reflector and the sidewall of the roller, wherein, the fluorescence of the at least one color emitted by the fluorescent area of the sidewall of the roller excited by the first excitation light is reflected back into the roller through the dichroic film, and the light receiving lens is configured to receive the fluorescence of the at least one color reflected by the dichroic film and emit the received fluorescence to the first reflector; and a light homogenizing device disposed on an optical path of the first excitation light transmitted by the dichroic mirror and the fluorescence of the at least one color reflected by the dichroic mirror, wherein the light homogenizing device is configured to receive the first excitation light reflected by the third reflector and transmitted through the dichroic mirror, receive the fluorescence of the at least one color reflected by the dichroic film, the first reflector, and the dichroic mirror, and uniformly emit three primary-color light.

The wavelength conversion device and projection light source are provided by examples of the present disclosure. The wavelength conversion device may comprise a roller, a drive motor, a first reflector, a support shaft and a drive module. The axis of the support shaft may be coincided with the axis of the roller. The support shaft may be not rotated with rotation of the roller. The roller may be moved back and forth along the axial direction of the support shaft. When the drive motor drives the roller to rotate, the drive module may be configured to drive the roller to move back and forth along the axial direction of the support shaft. The drive module may drive the roller to move back and forth along the axial direction of the support shaft, such that the excitation light reflected by the first reflector may be incident on each part of the sidewall of the roller. The excitation light may be not incident on a fixed area of the wavelength conversion device all the time. In this way, the fluorescent powder on the sidewall of the roller may not be continuously irradiated by laser light for a long time, and thus the fluorescent powder may be irradiated uniformly without a too high temperature rising. Conversion efficiency of the fluorescent powder may be improved. Light emission quality and service life of the projection light source may be improved.

BRIEF DESCRIPTION OF DRAWINGS

The details of one or more embodiments of the subject matter described in the present disclosure are set forth in the accompanying drawings and description below. Other features, aspects, and advantages of the subject matter will become apparent from the description, the drawings, and the claims. Features of the present disclosure are illustrated by way of example and not limited in the following figures, in which like numerals indicate like elements.

DETAILED DESCRIPTION

To make purpose, technical solutions and advantages of the present disclosure clearer, specific implementations of the present disclosure will be described in further detail below with reference to the accompanying figures.

Figure 1A:
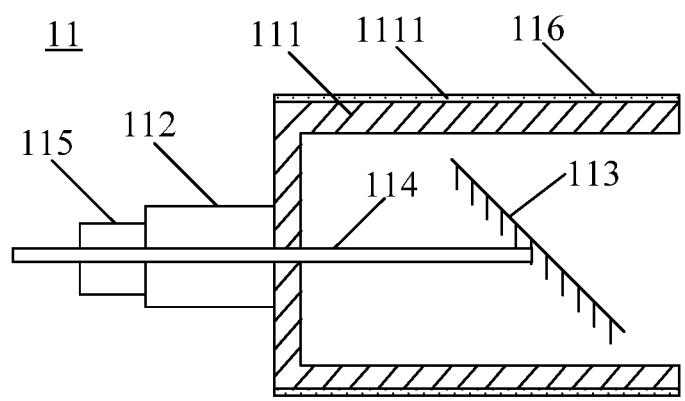
FIG. 1A is an axial cross-section diagram of a device for converting wavelength provided by an example of the present disclosure.
Figure 1B:
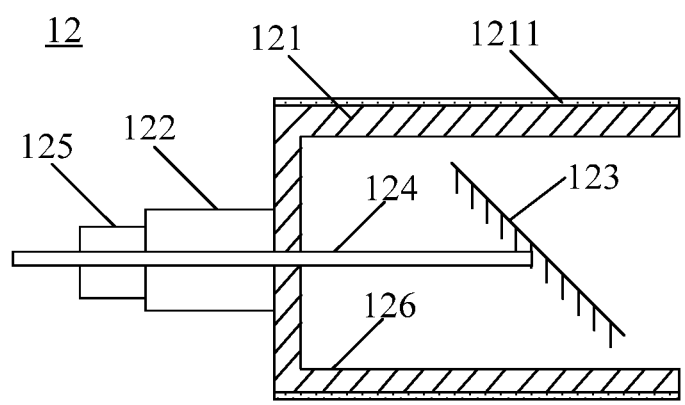
FIG. 1B is an axial cross-section diagram of a device for converting wavelength provided by another example of the present disclosure.

A device for converting wavelength is provided in an example of the present disclosure as shown in FIG. 1A and FIG. 1B. FIG. 1A and FIG. 1B are axial cross-section views of devices for converting wavelength. The devices for converting wavelength 11, 12 may comprise rollers 111, 121, drive motors 112, 122, first reflectors 113, 123, support shafts 114, 124, drive modules 115, 125 and dichroic films 116, 126.

With reference to FIG. 1A, the device 11 for converting wavelength is a reflection type wavelength conversion device. Wherein a sidewall of the roller 111 may be made of a light transmitting medium and a fluorescent powder layer 1111 may be disposed on an outer surface of the sidewall of the roller 111. The fluorescent powder layer 1111 may comprise fluorescent powder of at least one color and a fluorescent area may be formed on the fluorescent powder layer 1111.

The drive motor 112 may be configured to drive the roller 111 to rotate around the support shaft 114. An axis of the support shaft 114 may be coincided with an axis of the roller 111. The support shaft 114 may not rotate with the rotation of the roller 111. The roller 111 may also be driven by the drive module 115 to move back and forth along an axial direction of the support shaft 114. The support shaft 114 may be coaxially fixed with the drive motor 112.

The first reflector 113 may be disposed within the roller 111 and fixedly connected with the support shaft 114. There may be a preset angle between a mirror surface of the first reflector 113 and the axis of the support shaft 114. The first reflector 113 may be configured to reflect excitation light incident on the roller 111 to the fluorescent area of the roller 111 during the movement of the roller 111, so that fluorescent powder of at least one color may be excited to emit fluorescence of at least one color. The fluorescence may be transmitted through the sidewall of the roller 111. The transmitted fluorescence may be reflected back into the roller 111 through the dichroic film 116. The dichroic film 116 may be disposed on an outer side which is away from the axis of the roller 111 of the fluorescent powder layer 1111, such as on the outer surface of the fluorescent powder layer 1111 to transmit excitation light and reflect fluorescence.

In the reflection type wavelength conversion device 11, the fluorescence reflected back into the roller 111 may be reflected by the first reflector 113 and emitted from the roller 111 along an axial direction of the roller 111.

With reference to FIG. 1B, the device 12 for converting wavelength is a transmission type wavelength conversion device. Wherein a sidewall of the roller 121 may be made of a light transmitting medium and a fluorescent powder layer 1211 may be disposed on an outer surface of the sidewall of the roller 121. The fluorescent powder layer 1211 may comprise fluorescent powder of at least one color and a fluorescent area may be formed on the fluorescent powder layer 1211.

The drive motor 122 may be configured to drive the roller 121 to rotate around the support shaft 124. An axis of the support shaft 124 may be coincided with an axis of the roller 121. The support shaft 124 may not rotate with the rotation of the roller 121. The roller 121 may also be driven by the drive module 125 to move back and forth along an axial direction of the support shaft 124. The support shaft 124 may be coaxially fixed with the drive motor 122.

The first reflector 123 may be disposed within the roller 121 and fixedly connected with the support shaft 124. There may be a preset angle between a mirror surface of the first reflector 123 and the axis of the support shaft 124. The first reflector 123 may be configured to reflect excitation light incident on the roller 121 to the fluorescent area of the roller 121 during the movement of the roller 121, so that fluorescent powder of at least one color may be excited to emit fluorescence of at least one color. The dichroic film 126 may be disposed on an inner side which is closer to the axis of the roller 121 of the fluorescent powder layer 1211, such as on the inner surface of the sidewall of the roller 121 to transmit excitation light and reflect fluorescence. In this way, the fluorescence may be transmitted through the sidewall of the roller 121.

A principle of the present disclosure will be described below by taking the reflection type wavelength conversion device shown in FIG. 1A as an example. Of course, a principle of the transmission type wavelength conversion device shown in FIG. 1B may be basically the same as that of the reflection type wavelength conversion device shown in FIG. 1A except that the position of the dichroic film 126 is different and a transmission light path of fluorescence emitted by the fluorescent powder is different.

The first reflector 113 may be configured to reflect excitation light incident on the roller 111 to the sidewall of the roller 111. When the roller 111 is driven by the drive motor 112 to rotate around the support shaft 114 and driven by the drive module 115 to move back and forth along the axial direction of the support shaft 114, excitation light reflected by the first reflector 113 to the sidewall of the roller 111 may be incident on each of the fluorescent powder transmitting areas of the fluorescent powder layer 1111 successively. When the excitation light is incident to a first fluorescent powder transmitting area, fluorescent powder of a first color comprised in the first fluorescent powder transmitting area may be excited by the excitation light in a way that fluorescence of the first color may be generated. The fluorescence of the first color may be directed toward the outer side of the sidewall of the roller 111. When the excitation light is incident on a second fluorescent powder transmitting area, fluorescent powder of a second color comprised in the second fluorescent powder transmitting area may be excited by the excitation light in a way that fluorescence of the second color may be generated. The fluorescence of the second color may be directed toward the outer side of the sidewall of the roller 111. And so on, at least one fluorescent powder transmitting area is sequentially excited while the roller 111 is rotating. The excited fluorescent powder layer may emit fluorescence of at least one color. The fluorescence of at least one color may be directed to the outer side of the sidewall of the roller 111.

It may be noted that the fluorescent powder layer may be a part of the roller. The fluorescent powder layer may be formed by coating fluorescent powder on the inner surface or outer surface of the sidewall of the roller. The outer surface of the sidewall of the roller coated with fluorescent powder in FIG. 1A and FIG. 1B is not intended to represent a limitation on the present disclosure.

Figure 2:
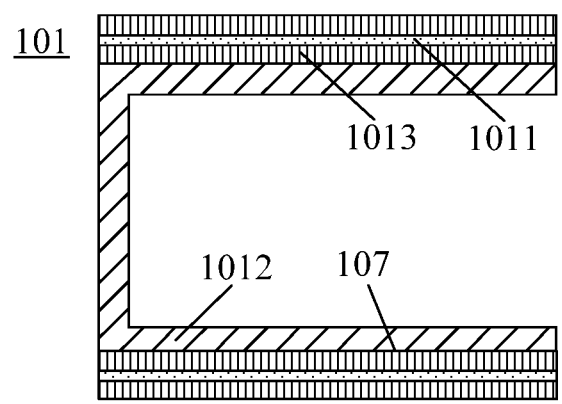
FIG. 2 is a schematic view of an inner structure of a roller provided by an example of the present disclosure.

FIG. 2 is a schematic view of an inner structure of a roller. As shown in FIG. 2, the roller 101 may comprise a glass cylinder 1012 and inorganic powder 1013. The inorganic powder 1013 may be in a cylindrical structure. The inorganic powder 1013 may be wrapped on an outer side of the glass cylinder 1012. The inorganic powder 1013 may comprise a fluorescent powder layer 1011. FIG. 2 is an exemplary illustration that the inorganic powder may comprise a fluorescent powder layer. In practice, the inorganic powder may be formed by mixing ceramic, glass and other inorganic materials with inorganic powder through high-temperature sintering. The fluorescent powder layer 1011 may be distributed regularly or irregularly in the inorganic powder 1013.

As shown in FIG. 2, the roller 101 may further comprise an antireflection film 107. The antireflection film 107 may be disposed between the glass cylinder 1012 and the inorganic powder 1013. The antireflection film 107 may be used to increase transmittance of excitation light transmitted from a sidewall of the roller 101 when the excitation light reflected by the first reflector is incident to the antireflection film 107.

According to an example, the sidewall of the roller 101 may comprise a transmitting area. The transmitting area may be disposed adjacent to the fluorescent area. When excitation light is incident on the transmitting area with the movement of the roller 101, the excitation light may be transmitted through the transmitting area outside the sidewall of the roller 101. Furthermore, a device for converting wavelength may also be used to receive laser irradiation of non-excitation light. The transmitting area may comprise an excitation light transmitting area and a non-excitation light transmitting area. The non-excitation light transmitting area may be disposed for transmitting non-excitation light.

Figure 3:
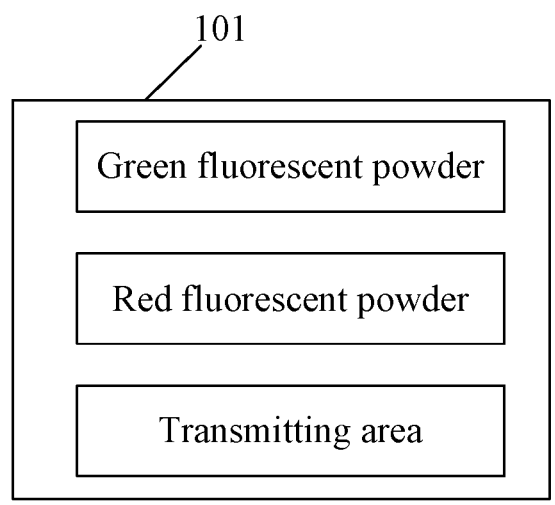
FIG. 3 is a schematic view of a distribution of a fluorescent powder layer provided by an example of the present disclosure.

The fluorescent powder layer 1011 may comprise fluorescent powder of at least one color. For example, the fluorescent powder layer 1011 may comprise at least one of green fluorescent powder, red fluorescent powder and blue fluorescent powder. In particular, the device for converting wavelength may belong to a part of a projection light source. FIG. 3 is a top view of the roller, indicating a distribution of the fluorescent powder layer 1011 on the sidewall of the roller 101. As shown in FIG. 3, if light emitted by an original light source of the projection light source is blue laser light, the fluorescent powder layer 1011 may comprise green fluorescent powder and red fluorescent powder. The device for converting wavelength may also have a transmitting area on its cylindrical wall. The transmitting area may not comprise fluorescent powder, so that the blue laser light may be transmitted directly. In this way, the green fluorescent powder and red fluorescent powder may be excited to emit green fluorescence and red fluorescence respectively. The blue laser light may be transmitted directly through the transmitting area. Three primary-color light may be formed by the green fluorescence, red fluorescence and blue laser light. The three primary-color light may be emitted uniformly by the projection light source for projection.

Alternatively, the original light source of the projection light source emits blue excitation light and red laser light, such that the fluorescent powder layer 1011 may only comprise green fluorescent powder. The blue excitation light may be transmitted directly through the excitation light transmitting area of the sidewall of the roller 101. The red laser light may be transmitted through the non-excitation light transmitting area of the sidewall of the roller 101. The green fluorescent powder may be excited by the blue excitation light to emit green light. In this way, three primary-color light of red, green and blue may also be formed.

Figure 4:
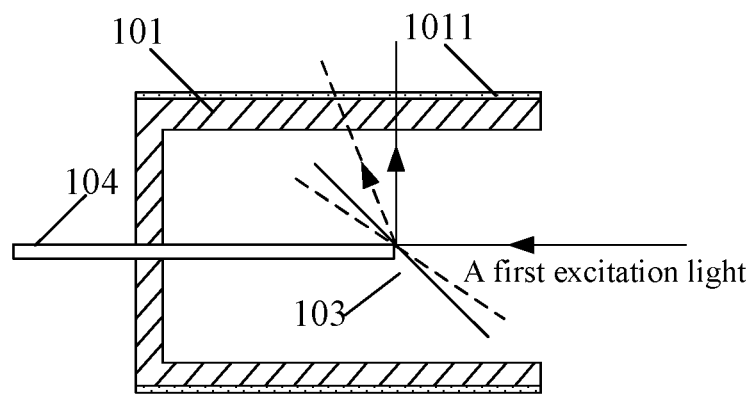
FIG. 4 is an axial cross-section view of a roller provided by an example of the present disclosure.

According to an example, the angle between the mirror surface of the first reflector 103 and the axis of the support shaft 104 may be 45 degrees as shown in FIG. 4, that is, the preset angle is 45 degrees. FIG. 4 is an axial cross-section view of the roller 101. A first excitation light transmitted along the axial direction of the support shaft 104 may be reflected by the first reflector 103 to the sidewall of the roller 101, so as to excite the fluorescent powder to emit light of other colors or transmit the sidewall of the roller 101 directly. Therefore, when the preset angle is 45 degrees, the first excitation light may be passed through the sidewall of the roller 101 in a positive direction without being emitted obliquely, so the preset angle 45 degrees may be believed as a preferable incidence angle. Of course, the preset angle may also be configured with other degrees, such as 30 degrees, 60 degrees, etc. In addition, a light receiving lens may be disposed outside the sidewall of the roller 101 to guide a transmission direction of light emitted from the sidewall of the roller 101.

Figure 5:
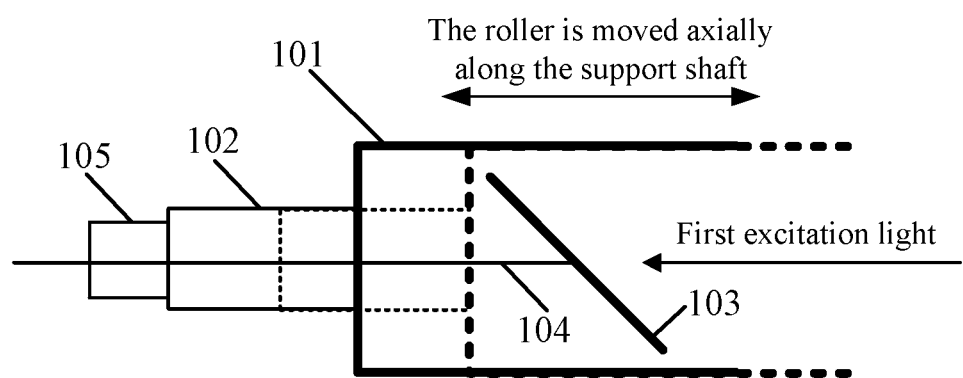
FIG. 5 is a schematic diagram of a movement effect of a roller provided by an example of the present disclosure.

With reference to FIG. 5, when the drive motor 102 drives the roller 101 to rotate, the drive module 105 may drive the roller 101 to move back and forth along the axial direction of the support shaft 104 simultaneously. Compared with an incident point of excitation light on the wavelength conversion device in a single circular motion, a spiral circular motion in an example of the present disclosure makes it possible to increase an area covered by the excitation light spot in a same time period. Therefore, excitation light energy density per unit area may be reduced, which is conducive to reducing temperature of the fluorescent powder layer and improving fluorescence conversion efficiency.

Figure 6:
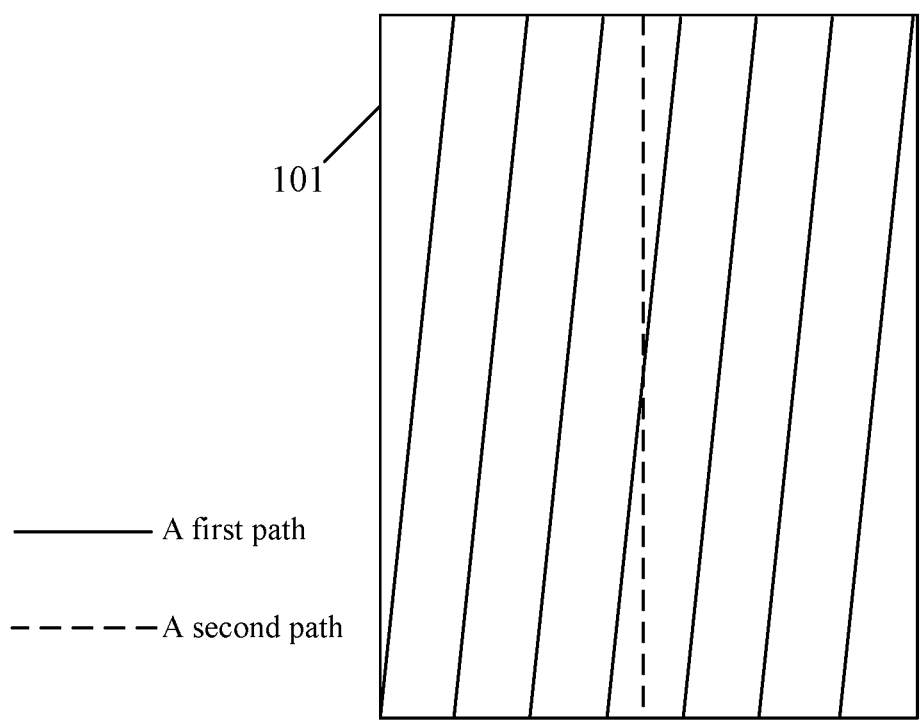
FIG. 6 is a schematic diagram of a light path provided by an example of the present disclosure.

Take the first excitation light reflected by the first reflector 103 as an example. At this time, an exit path of the first excitation light reflected by the first reflector 103 on the sidewall of the roller 101 may be a first path as shown in FIG. 6. FIG. 6 illustrates an expanded view of the sidewall of the roller 101. If the roller 101 may not move along the axial direction of the support shaft 104 while rotating around the support shaft 104, an exit path of the first excitation light reflected by the first reflector 103 on the sidewall of the roller 101 may be a second path as shown in FIG. 6. Compared the first path with the second path, the wavelength conversion device provided in the present disclosure, since the roller 101 moves back and forth along the axial direction of the support shaft 104 while rotating, fluorescent powder of each area on the sidewall of the roller 101 may be excited uniformly. Light conversion efficiency of the whole fluorescent powder layer 1011 may be improved. In addition, since the excitation light irradiates back and forth in each area of the sidewall of the roller 101 without a fixed area being always irradiated, extreme high temperature of the fixed area of the fluorescent powder layer may be effectively prevented and light emission quality and efficiency may be improved.

Figure 7:
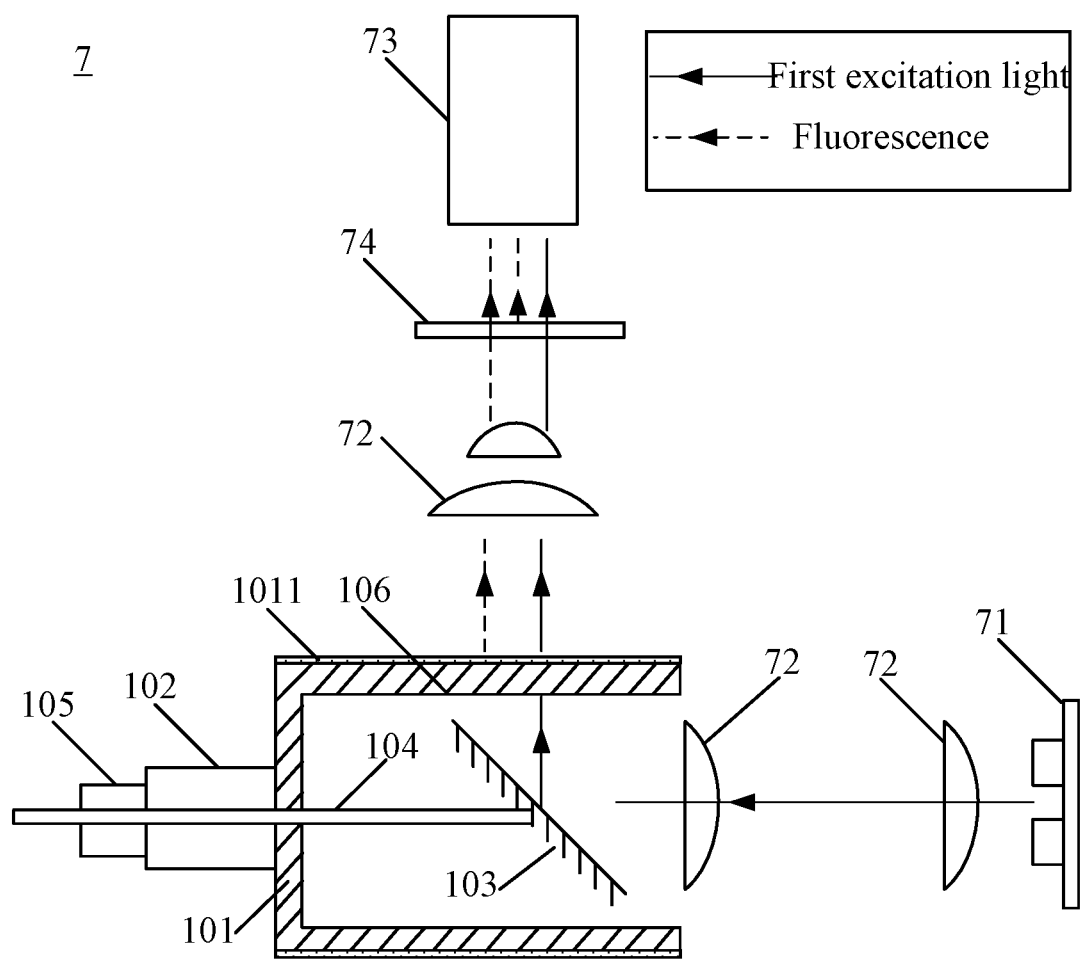
FIG. 7 is a schematic view of a structure of a projection light source provided by an example of the present disclosure.

With reference to the device for converting wavelength shown FIG. 1B, a projection light source is provided in an example of the present disclosure. FIG. 7 is a schematic view of a structure of the projection light source according to an example of the present disclosure. The projection light source 7 may comprise the transmission type wavelength conversion device as shown in FIG. 1B. The projection light source 7 may further comprise a first laser light emitting device 71, a light receiving lens 72 and a light homogenizing device 73.

Wherein, the first laser light emitting device 71 may be configured to emit a first excitation light to the mirror surface of the first reflector 103 along the axial direction of the support shaft 104 of the wavelength conversion device.

The light receiving lens 72 may be configured to receive fluorescence of at least one color and the first excitation light transmitted through the sidewall of the roller 101 and emit the received light to the light homogenizing device 73.

The light homogenizing device 73 may be configured to receive fluorescence of at least one color and the first excitation light emitted from the light receiving lens 72 and emit three primary-color light uniformly.

In an example, the dichroic film 106 may be disposed on an inner side which is closer to the axis of the roller 101 of the fluorescent powder layer 1011. For example, if the fluorescent powder layer 1011 is coated on the inner surface of the sidewall of the roller 101, the fluorescent powder layer 1011 may be disposed between the dichroic film 106 and the roller 101. If the fluorescent powder layer 1011 is coated on the outer surface of the sidewall of the roller 101, the fluorescent powder layer 1011 may be disposed outside the dichroic film 106 and the sidewall of the roller 101 as shown in FIG. 7. The dichroic film 106 may be configured to transmit the first excitation light and reflect fluorescence of at least one color. A plurality of light receiving lens 72 may be disposed on an optical path between the first laser light emitting 71 and the light homogenizing device 73.

The first excitation light may be blue laser light. The fluorescent powder layer 1011 may comprise green fluorescent powder and red fluorescent powder. When the first excitation light passes through the sidewall of the roller 101, blue laser light, green fluorescence and red fluorescence may be transmitted through the sidewall of the roller 101. In this way, three primary-color light may be emitted after the blue laser light, green fluorescence and red fluorescence are received by the light receiving lens 72, and the three primary-color light may be emitted to the light homogenizing device 73. The light homogenizing device 73 may emit the three primary-color light uniformly.

Alternatively, the first excitation light may be blue laser light. The fluorescence powder layer 1011 may comprise green fluorescent powder and yellow fluorescent powder. When the first excitation light passes through the sidewall of the roller 101, blue laser light, green fluorescence and yellow fluorescence may be transmitted. In this condition, the projection light source 7 may further comprise a color filter wheel 74. The color filter wheel 74 may be disposed between the light receiving lens 72 and the light homogenizing device 73. The color filter wheel 74 may be configured to filter color of the blue laser light, green fluorescence and yellow fluorescence passing through the light receiving lens 72 and output three primary-color light. The light homogenizing device 73 may be used to emit the three primary-color light outputted by the color filter wheel 74 uniformly.

Figure 8A:
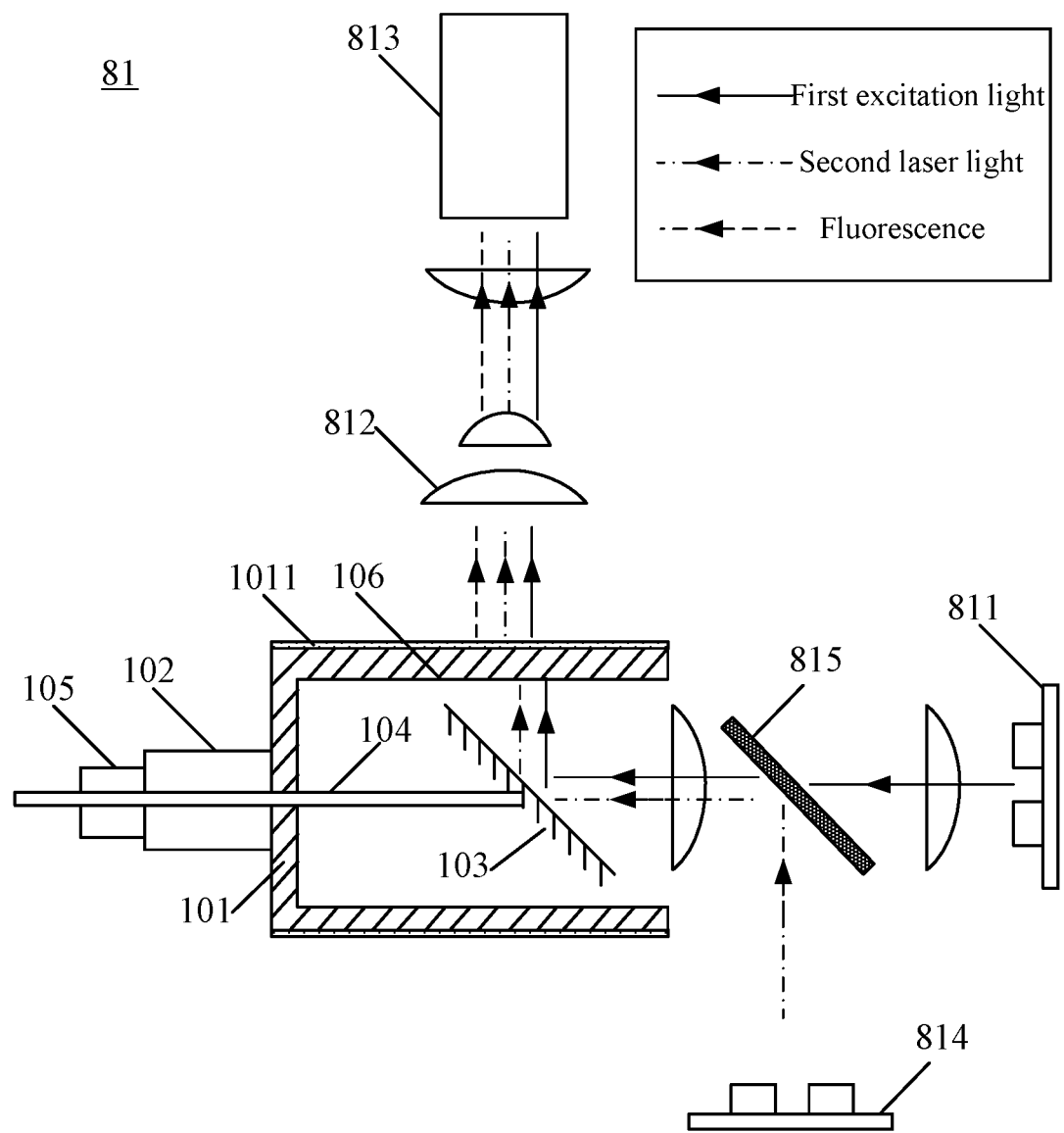
FIG. 8A is a schematic view of a structure of a projection light source provided by another example of the present disclosure.
Figure 8B:
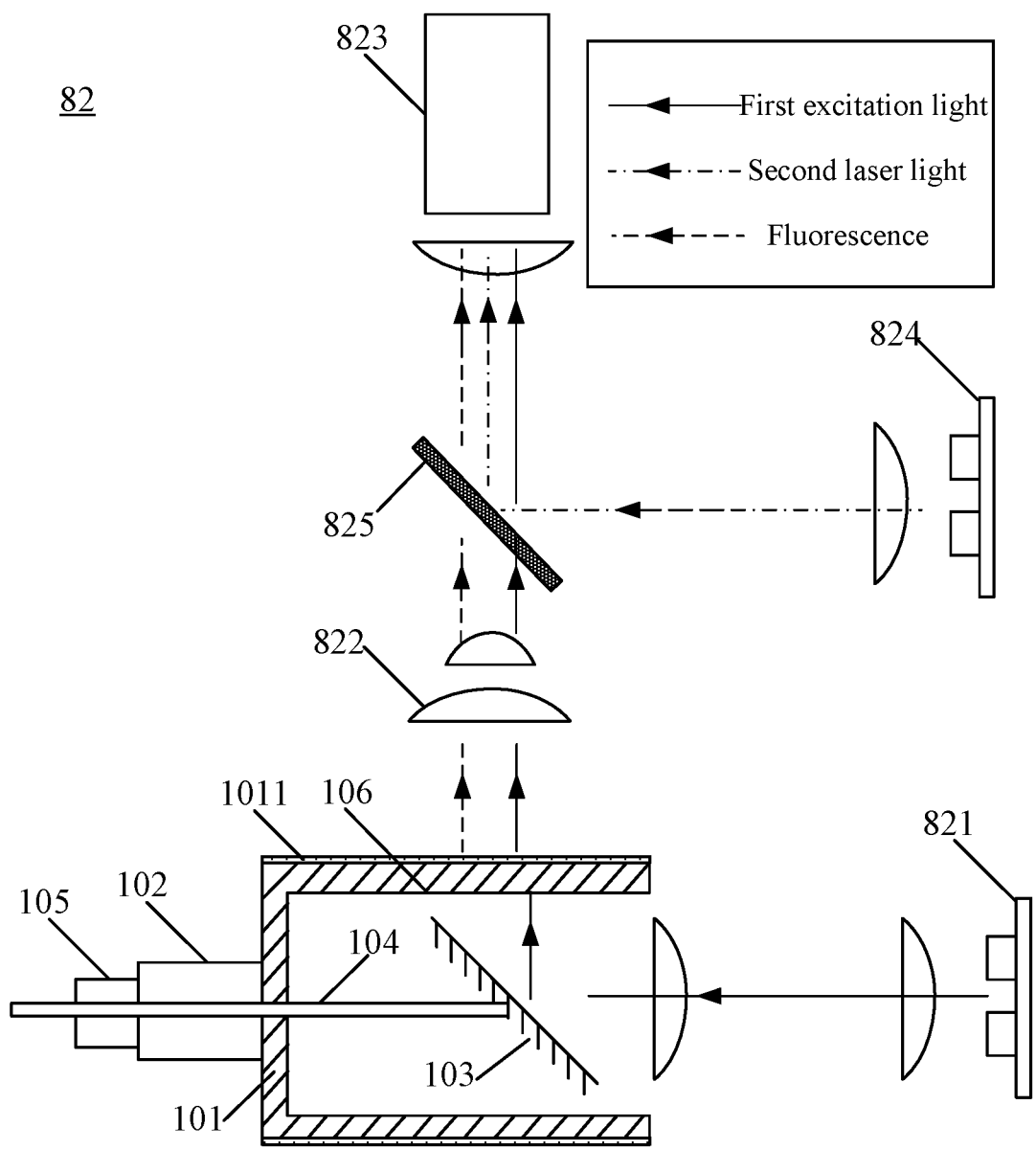
FIG. 8B is a schematic view of a structure of a projection light source provided by still another example of the present disclosure.

With reference to the device for converting wavelength shown FIG. 1B, a projection light source is provided in an example of the present disclosure. As shown in FIG. 8A and FIG. 8B, projection light sources 81, 82 may comprise the transmission type wavelength conversion device shown in FIG. 1B, wherein the dichroic film 106 may be disposed on the inner side which is closer to the axis of the roller 101 of the fluorescent powder layer 1011. The projection light sources 81, 82 may further comprise first laser light emitting devices 811, 821, light receiving lenses 812, 822, light homogenizing devices 813, 823 and second laser light emitting devices 814, 824.

Wherein, the first laser light emitting devices 811, 812 may be configured to emit the first excitation light to the mirror surface of the first reflector 103 along the axial direction of the support shaft 104 of the wavelength conversion device.

The second laser light emitting devices 814, 824 may be configured to emit a second laser light. The second laser light and the first excitation light are different in color.

The light receiving lenses 812, 822 may be configured to receive fluorescence of at least one color, the first excitation light and the second laser light transmitted through the sidewall of the roller 101 and emit the received light to the light homogenizing devices 813, 823.

The light homogenizing devices 813, 823 may be configured to receive the second laser light, fluorescence of at least one color and the first excitation light and emit three primary-color light uniformly.

In FIG. 8A and FIG. 8B, the projection light sources 81, 82 may further comprise dichroic mirrors 815, 825. The dichroic mirrors 815, 825 may be configured to change an optical path of the second laser light, so that the second laser light may also be incident on the light homogenizing devices 813, 823. The second laser light may be incident on the light homogenizing devices 813, 823 in other manners without limitation in the present disclosure.

The first excitation light and second laser light may be emitted directly without being converted by the fluorescent powder layer 1011. The fluorescent powder layer 1011 on the roller 101 may not comprise fluorescent powder whose color is the same as the first excitation light and the second laser light. In order to make the projection light sources 81, 82 emit the three primary-color light uniformly, colors of the first excitation light and the second laser light may be two primary color respectively. The fluorescent powder of the other primary color in three primary colors may be comprised in the fluorescent powder layer 1011. For example, color of the first excitation light may be blue, color of the second laser light may be red, and the fluorescent powder layer 1011 may only comprise green fluorescent powder.

In an example, the dichroic mirror may be disposed to transmit one of the first excitation light and the second laser light and reflect the other. In this way, the first excitation light and the second laser light may be both incident on the mirror surface of the first reflector 103. For example, the second laser light may be reflected by the first reflector 103, transmitted through the sidewall of the roller 101 and emitted toward the light homogenizing device after received by the light receiving lens.

FIG. 8A illustrates a structure of a projection light source 81. As shown in FIG. 8A, the dichroic mirror 815 may be disposed between the first laser light emitting device 811 and the first reflector 103. The dichroic mirror 815 may be configured to transmit the first excitation light and reflect the second laser light, so that the first excitation light and the second laser light may be incident on the mirror surface of the first reflector 103. In this way, the first excitation light may be transmitted through the dichroic mirror 815 and emitted toward the first reflector 103. The second laser light may be reflected by the dichroic mirror 815 and emitted toward the first reflector 103. Both of the first excitation light and the second laser light may be reflected by the first reflector 103 and transmitted through the sidewall of the roller 101. The fluorescent powder layer 1011 may be excited by the first excitation light to emit fluorescence. The first excitation light, second laser light and fluorescence may be received by the light receiving lens 812 and then form three primary-color light to be emitted toward the light homogenizing device 813. The light homogenizing device 813 may emit the three primary-color light uniformly.

Alternatively, in another example, the dichroic mirror 815 may be configured to reflect one of the second laser light and a light outputted by the light receiving lens and transmit the other. In this way, the second laser light and the light outputted by the light receiving lens may be emitted toward the light homogenizing device.

FIG. 8B illustrates a structure of another projection light source 82. As shown in FIG. 8B, a mirror surface of the dichroic mirror may be disposed parallel to the mirror surface of the first reflector. The dichroic mirror 825 may be disposed between the light homogenizing device 823 and the second laser light emitting device 824. The dichroic mirror 825 may be configured to reflect the second laser light and transmit the light outputted by the light receiving lens 822, so that the light outputted by the light receiving lens 822 may be emitted toward the light homogenizing device 823. The light outputted by the light receiving lens 822 may comprise the first excitation light and fluorescence. In this way, the first excitation light may be reflected by the first reflector 103, and then transmitted through the sidewall of the roller 101. In this way, when the first excitation light passes through the fluorescent powder layer 1011, fluorescence may be generated by the excited fluorescent powder. The first excitation light and fluorescence may be transmitted through the dichroic mirror 825 and then emitted to the light homogenizing device 823. The second laser light may be reflected by the dichroic mirror 825 and emitted to the light homogenizing device 823. The light homogenizing device 823 may emit three primary-color light uniformly after receiving the first excitation light, fluorescence and second laser light.

FIG. 7, FIG. 8A and FIG. 8B illustrate three projection light sources, which all comprise the transmission type wavelength conversion device. The three primary-color light may be generated by using the first excitation light and fluorescence of at least one color. Or the three primary-color light may be formed by using the first excitation light, second laser light and fluorescence of other colors. Of course, these are for illustration only, according to the principle for the wavelength conversion device of the present disclosure, four primary-color light may be generated. The principle for forming four primary-color light may be the same as that of three primary-color light, so the present disclosure will not be described in detail herein. The three primary-color light outputted by the projection light source may be outputted continuously in accordance with time. What human eyes can see may be white light, which may be used for projecting.

Figure 9:
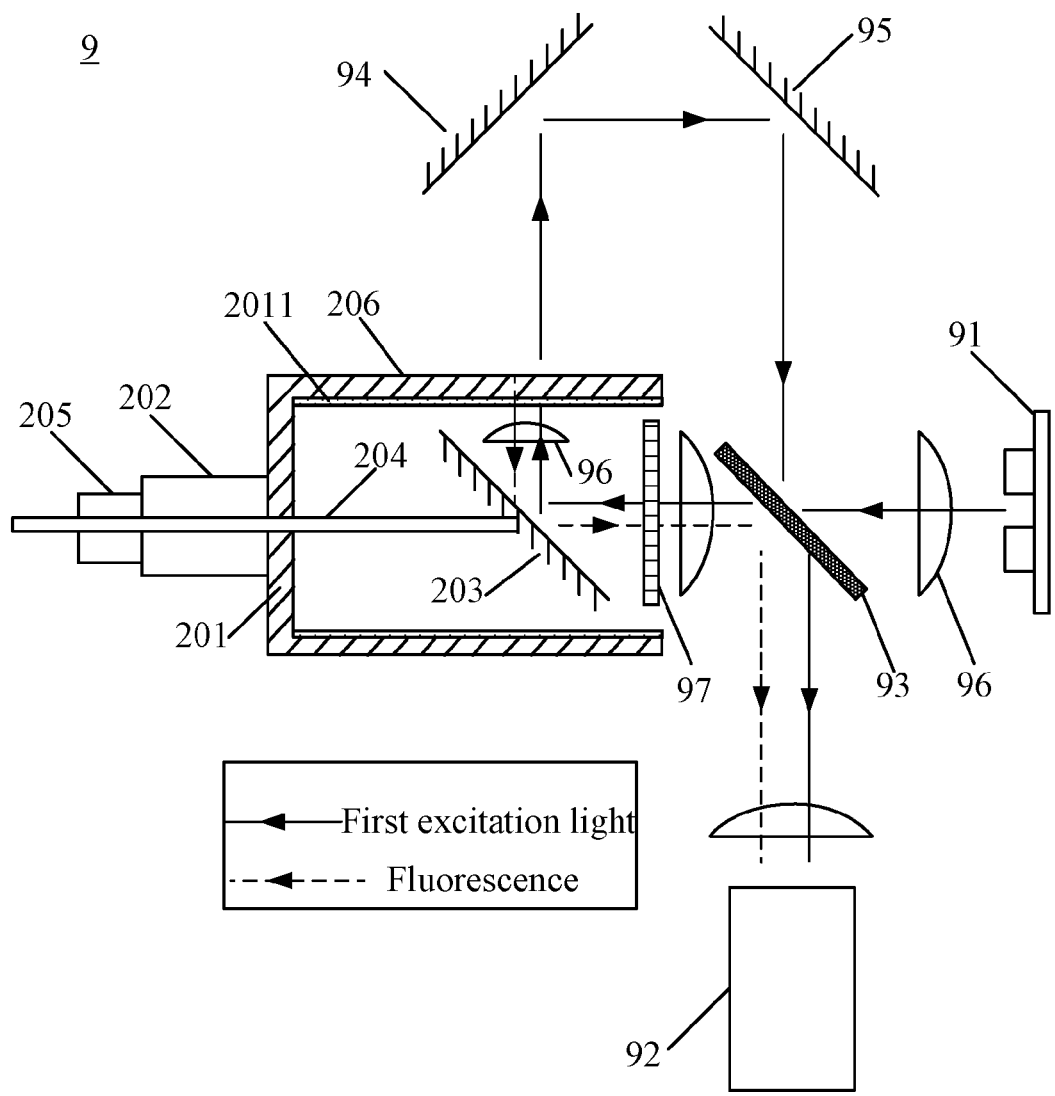
FIG. 9 is a schematic view of a structure of a projection light source provided by still another example of the present disclosure.

With reference to the device for converting wavelength shown FIG. 1A, a projection light source is provided in another example of the present disclosure. As shown in FIG. 9, the projection light source 9 may comprise the reflection type wavelength conversion device shown in FIG. 1A, wherein the dichroic film 206 may be disposed on the outer side which is away from the axis of the roller 201 of the fluorescent powder layer 2011. The projection light source 9 may further comprise a first laser light emitting device 91, a light homogenizing device 92, a dichroic mirror 93, a second reflector 94, a third reflector 95 and a light receiving lens 96.

The first laser light emitting device 91 may be configured to emit a first excitation light to the mirror surface of the first reflector 203 along the axial direction of the support shaft 204 of the wavelength conversion device.

The dichroic mirror 93 may be disposed between the first laser light emitting device 91 and the first reflector 203 to transmit the first excitation light.

The second reflector 94 may be disposed on an optical path of the first excitation light transmitted by the roller 201 and the dichroic film 206 in a way that the first excitation light may be reflected to the third reflector 95.

The third reflector 95 may be disposed on an optical path of the first excitation light reflected by the second reflector 94 in a way that the first excitation light reflected by the second reflector 94 may be reflected to the dichroic mirror 93.

The light receiving lens 96 may be disposed on an optical path between the first reflector 203 and the sidewall of the roller 201. The fluorescent powder layer 2011 on the inner surface of the sidewall of the roller 201 may be excited by the first excitation light to emit fluorescence of at least one color. The fluorescence of at least one color may be reflected back into the roller 201 by the dichroic film 206 on the outer surface of the sidewall of the roller 201. The light receiving lens 96 may be used to receive fluorescence of at least one color reflected by the dichroic film 206 and emit them towards the first reflector 203.

The light homogenizing device 92 may be disposed on an optical path of the first excitation light transmitted by the dichroic mirror 93 and the fluorescence reflected by the dichroic mirror 93. The light homogenizing device 92 may be configured to receive the first excitation light reflected by the third reflector 95 and transmitted through the dichroic mirror 93, receive the fluorescence reflected by the dichroic film 206 and the first reflector 203 and the dichroic mirror 93, and uniformly emit three primary-color light.

A diffuser sheet 97 may be disposed between the first reflector 203 and dichroic mirror 93. Fluorescence transmittance may be increased through the diffuser sheet 97. On an optical path of the first excitation light, a plurality of light receiving lenses 96 may also be disposed.

The first excitation light may be transmitted through the dichroic mirror 93 and then reflected by the first reflector 203 to emit into the sidewall of the roller 201. Since the fluorescent powder layer 2011 is disposed on the inner surface of the sidewall of the roller 201, fluorescence of at least one color may be generated when the first excitation light is transmitted through the sidewall of the roller 201. Since the outer surface of the sidewall of the roller 201 is coated with the dichroic film 206, the first excitation light may be transmitted through the dichroic film 206, reflected by the second reflector 94 and the third reflector 95, and emitted towards the light homogenizing device 92 after being transmitted by the dichroic mirror 93. Fluorescence of at least one color may be reflected back into the roller 201 by the dichroic film 206. It may be noted here that fluorescence of at least one color reflected back into the roller 201 by the dichroic film 206 may be received by the light receiving lens 96 and then emitted towards the first reflector 203. Fluorescence of at least one color reflected by the dichroic film 206 may be transmitted in diffuse directions. Fluorescence of at least one color may be concentrated on the mirror surface of the first reflector 203 due to a focusing effect of the light receiving lens 96. The fluorescence may be reflected by the first reflector 203, reflected by the dichroic mirror 93 and emitted towards the light homogenizing device 92. The homogenizing device 92 may receive the first excitation light and fluorescence of at least one color and emit three primary-color light uniformly. Since an optical path of fluorescence of at least one color is folded in the roller 201, volume of the projection light source may be reduced. Additionally, when the drive motor 202 drives the roller 201 to rotate, the drive module 205 may drive the roller 201 to move back and forth along the axial direction of the support shaft 204 simultaneously. Therefore, excitation light energy density per unit area may be reduced, which is conducive to reducing temperature of the fluorescent powder layer and improving fluorescence conversion efficiency.

The above are only preferred examples of the present disclosure is not intended to limit the disclosure within the spirit and principles of the present disclosure, any changes made, equivalent replacement, or improvement in the protection of the present disclosure should contain within the range.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

What is claimed is:
1. A device for converting wavelength, comprising:
a roller with a sidewall made of a light transmitting medium, wherein the sidewall of the roller comprises a fluorescent area;
a support shaft with an axis coincided with an axis of the roller;
a drive motor to drive the roller to rotate around the support shaft;
a drive module to drive the roller to move back and forth along an axial direction of the support shaft;
a first reflector disposed in the roller and fixedly connected with the support shaft, wherein, there is a preset angle between a mirror surface of the first reflector and the axis of the support shaft, and the first reflector is used to reflect excitation light incident on the roller toward the fluorescent area in a way that fluorescence of at least one color is generated and transmitted through the sidewall of the roller; and a dichroic film disposed on an inner side which is closer to the axis of the roller than the fluorescent area and configured to transmit the excitation light and reflect the fluorescence of the at least one color.

2. The device according to claim 1, wherein the sidewall of the roller further comprises a transmitting area, the transmitting area is disposed adjacent to the fluorescent area, and the excitation light is transmitted through the transmitting area and emitted out from the sidewall of the roller.

3. The device according to claim 2, wherein the transmitting area comprises an excitation light transmitting area and a non-excitation light transmitting area, the non-excitation light transmitting area is configured to transmit non-excitation light, and the excitation light transmitting area is configured to transmit the excitation light.

4. The device according to claim 1, wherein the fluorescent area comprises a fluorescent powder layer, and the fluorescent powder layer is formed by coating fluorescent powder of at least one color on an inner surface or an outer surface of the sidewall of the roller.

5. The device according to claim 1, wherein, the roller comprises a glass cylinder and inorganic powder, the inorganic powder is coated on an outer side of the glass cylinder, and the inorganic powder comprises fluorescent powder of at least one color for forming the fluorescent area.

6. The device according to claim 5, further comprising an antireflection film, wherein the antireflection film is disposed between the glass cylinder and the inorganic powder to increase a transmittance of the excitation light.

7. The device according to claim 1, wherein the preset angel is 45 degrees.

8. A projection light source, comprising:

the device for converting wavelength according to claim 1;

a first laser light emitting device to emit a first excitation light to the mirror surface of the first reflector along the axial direction of the support shaft;

a light receiving lens to receive the fluorescence and the first excitation light transmitted through the sidewall of the roller and emit the received light; and a light homogenizing device to receive the fluorescence and the first excitation light emitted from the light receiving lens and uniformly emit three primary-color light.

9. The projection light source of claim 8, wherein, the first excitation light is blue laser light, the fluorescent area comprises green fluorescent powder and yellow fluorescent powder, and the blue laser light, green fluorescence and yellow fluorescence are generated when the first excitation light passes through the sidewall of the roller.

10. The projection light source of claim 9, further comprises a color filter wheel, wherein, the color filter wheel is disposed between the light receiving lens and the light homogenizing device to filter color of the blue laser light, green fluorescence and yellow fluorescence passing through the light receiving lens and output three primary-color light, and the light homogenizing device is configured to uniformly emit the three primary-color light outputted by the color filter wheel.

11. A projection light source, comprising:

the device for converting wavelength according to claim 1;

a first laser light emitting device to emit a first excitation light to the mirror surface of the first reflector along the axial direction of the support shaft;

a second laser light emitting device to emit a second laser light which is different in color from the first excitation light;

a light receiving lens to receive fluorescence and the first excitation light transmitted through the sidewall of the roller and emit the received light; and a light homogenizing device to receive he second laser light, the fluorescence and the first excitation light, and uniformly emit three primary-color light.

12. The projection light source of claim 11, further comprises a dichroic mirror, wherein, a mirror surface of the dichroic mirror is disposed parallel to the mirror surface of the first reflector;

the dichroic mirror is disposed between the first laser light emitting device and the first reflector in a way that the first excitation light is transmitted and the second laser light is reflected, such that both of the first excitation light and the second laser light are incident on the mirror surface of the first reflector; and the second laser light is reflected by the first reflector, transmitted through the sidewall of the roller and emitted to the light homogenizing device after received by the light receiving lens.

13. The projection light source of claim 11, further comprises a dichroic mirror, a mirror surface of the dichroic mirror is disposed parallel to the mirror surface of the first reflector;

the dichroic mirror is disposed between the light homogenizing device and the second laser light emitting device in a way that the second laser light is reflected and a light outputted by the light receiving lens is transmitted, such that both of the second laser light and the light outputted by the light receiving lens are incident on the light homogenizing device.

14. A device for converting wavelength, comprising:

a roller with a sidewall made of a light transmitting medium, wherein the sidewall of the roller comprises a fluorescent area;

a support shaft with an axis coincided with an axis of the roller;

a drive motor to drive the roller to rotate around the support shaft;

a drive module to drive the roller to move back and forth along an axial direction of the support shaft;

a first reflector disposed in the roller and fixedly connected with the support shaft, wherein, there is a preset angle between a mirror surface of the first reflector and the axis of the support shaft, and the first reflector is configured to reflect excitation light incident on the roller toward the fluorescent area in a way that fluorescence of at least one color is generated; and a dichroic film disposed on an outer side which is farther from the axis of the roller than the fluorescent area to transmit the excitation light and reflect the fluorescence of the at least one color.

15. The device according to claim 14, wherein the sidewall of the roller further comprises a transmitting area, the transmitting area is disposed adjacent to the fluorescent area, and the excitation light is transmitted through the transmitting area and emitted out from the sidewall of the roller.

16. The device according to claim 15, wherein the transmitting area comprises an excitation light transmitting area and a non-excitation light transmitting area, the non-excitation light transmitting area is configured to transmit non-excitation light, the excitation light transmitting area is configured to transmit the excitation light.

17. The device according to claim 14, wherein, the roller comprises a glass cylinder and inorganic powder, the inorganic powder is coated on an outer side of the glass cylinder, and the inorganic powder comprises fluorescent powder of at least one color for forming the fluorescent area.

18. The device according to claim 17, further comprising an antireflection film, wherein, the antireflection film is disposed between the glass cylinder and the inorganic powder to increase a transmittance of the excitation light.

19. The device for claim 14, wherein the preset angel is 45 degrees.

20. A projection light source, comprising:

the device for converting wavelength according to claim 14;

a first laser light emitting device to emit a first excitation light to the mirror surface of the first reflector along the axial direction of the support shaft;

a dichroic mirror disposed between the first laser light emitting device and the first reflector to transmit the first excitation light;

a second reflector disposed on an optical path of the first excitation light transmitted by the roller and the dichroic film in a way that the first excitation light is reflected;

a third reflector disposed on an optical path of the first excitation light reflected by the second reflector in a way that the first excitation light reflected by the second reflector is reflected to the dichroic mirror;

a light receiving lens disposed on an optical path between the first reflector and the sidewall of the roller, wherein, the fluorescence of the at least one color emitted by the fluorescent area of the sidewall of the roller excited by the first excitation light is reflected back into the roller through the dichroic film, and the light receiving lens is configured to receive the fluorescence reflected by the dichroic film and emit the received fluorescence to the first reflector; and a light homogenizing device disposed on an optical path of the first excitation light transmitted by the dichroic mirror and the fluorescence reflected by the dichroic mirror to receive the first excitation light reflected by the third reflector and transmitted through the dichroic mirror, receive the fluorescence reflected by the dichroic film and the first reflector and the dichroic mirror, and uniformly emit three primary-color light.

* * * * *